United States Patent
Palmroth

(10) Patent No.: US 11,559,012 B2
(45) Date of Patent: Jan. 24, 2023

(54) TIMBER WORKING DEVICE AND METHOD FOR CONTROLLING A TIMBER WORKING DEVICE AND A WORKING VEHICLE

(71) Applicant: Deere & Company, Moline, IL (US)

(72) Inventor: Lauri Palmroth, Tampere (FI)

(73) Assignee: Deere & Company, Moline, IL (US)

( * ) Notice: Subject to any disclaimer, the term of this patent is extended or adjusted under 35 U.S.C. 154(b) by 205 days.

(21) Appl. No.: 16/947,457

(22) Filed: Aug. 3, 2020

(65) Prior Publication Data
US 2021/0029899 A1  Feb. 4, 2021

(30) Foreign Application Priority Data
Aug. 2, 2019  (EP) .................................... 19189812

(51) Int. Cl.
*A01G 23/091*  (2006.01)
*A01G 23/095*  (2006.01)
*A01G 23/083*  (2006.01)

(52) U.S. Cl.
CPC .......... *A01G 23/095* (2013.01); *A01G 23/083* (2013.01); *A01G 23/091* (2013.01)

(58) Field of Classification Search
CPC .... A01G 23/08; A01G 23/083; A01G 23/091; A01G 23/093; A01G 23/095
See application file for complete search history.

(56) References Cited

U.S. PATENT DOCUMENTS

| | | | | |
|---|---|---|---|---|
| 6,516,841 B1* | 2/2003 | Oilund | ................. | A01G 23/083 144/34.1 |
| 7,296,602 B1* | 11/2007 | Riha | .................... | A01G 23/091 144/34.1 |
| 9,550,656 B2* | 1/2017 | Kivi | ..................... | B62D 53/021 |
| 2014/0096870 A1* | 4/2014 | Kaye | ...................... | B27G 19/00 144/420 |
| 2021/0339721 A1* | 11/2021 | Savolainen | ............... | B60T 7/12 |

FOREIGN PATENT DOCUMENTS

| | | | | |
|---|---|---|---|---|
| AT | 516408 B1 | 5/2016 | | |
| CA | 2921721 A1 | 8/2016 | | |
| DE | 102016208839 A1 | * 12/2016 | ............. | A01G 23/08 |
| DE | 102016208839 A1 | 12/2016 | | |
| FI | 104531 B | 2/2000 | | |
| WO | WO0015026 A1 | 3/2000 | | |
| WO | WO2005020669 A1 | 3/2005 | | |

OTHER PUBLICATIONS

European Search Report issued in counterpart application No. 19189812.1 dated Feb. 7, 2020 (08 pages).

* cited by examiner

*Primary Examiner* — Matthew Katcoff

(57) ABSTRACT

A timber working device, comprising a frame, having a feed axis, a drive system, configured to feed at least one stem along the feed axis, at least a pair of upper knives or lower knives movably attached to the frame, wherein the knives are configured to be controllable each by an actuator to open and close around a stem, a tilt mechanism comprising a controllable tilt bracket pivotably attached to the frame, to control a tilt position of the frame in relation to the tilt bracket.

14 Claims, 3 Drawing Sheets

TIMBER WORKING DEVICE AND METHOD FOR CONTROLLING A TIMBER WORKING DEVICE AND A WORKING VEHICLE

RELATED APPLICATIONS

This application claims the benefit of European Application Ser. No. 19189812.1, filed on Aug. 2, 2019, the disclosure of which is hereby expressly incorporated by reference in its entirety.

TECHNICAL FIELD

The present disclosure generally relates to a working device. An embodiment of the present disclosure relates to a timber working device.

BACKGROUND

Mobile work machines, in particular, forestry equipment and forestry machines, e.g. harvesters and forwarders, have an articulated boom and a tree stem processing tool at the tip of the boom. The tool can be e.g. a harvester head, a felling head, a harvesting and processing head, or a log grapple equipped with a sawing apparatus. The tool can be used e.g. to cut standing trees, to process felled trees or to grab objects, such as logs or tree stems. When using such a tool with power-driven operations, it is operated under the control of an operator of the work machine.

The mobile work machines comprise an articulated crane with the tool attached to a boom tip of the crane. Such tools handle heavy load, that may comprise a load of soil or logs or raw material. Usually such cranes are controlled by hydraulic actuators that are driven by hydraulic pressure from one or more pumps. The pumps are usually powered by the primary power source of the vehicle.

The stem processing tool or harvester tool comprises several movable knives that are used to grab the log/tree with the harvester tool. These knives are hydraulically actuated and controlled by the controller mounted on the harvester tool. Once the tree is grabbed with the harvester tool, a saw blade, usually at a bottom side of the harvester tool, is activated to cut the tree/stem. After the cutting process the tree will fall over, only being fixated in the harvester tool by the knives closed around the stem. Usually, within the harvester tool, feeding wheels are activated to pull/push the stem through the harvester tool and the knives, so that bark/branches are removed, and the log/stem is cut up into log pieces of determined size.

When the log/tree is cut and rests on the ground or is held by the harvester head it represents a resistance to the feeding wheels and causes additional torque and shear forces on the knives of the harvester head. The forces act on the knives in an opening direction, so that the hydraulic control of the knives needs to be adjusted to ensure a correct grip and position on the log to remove bark or branches. At the same time, due to a higher gripping force of the knives, the feeding wheel hydraulic motors also require a higher torque due to the higher gripping force of the knives.

DE102016208839A1 discloses a felling head with a tilt sensor which controls a high or low power of a hydraulic pump in order to switch between a high and low power hydraulic mode.

SUMMARY

Various aspects of examples of the present disclosure are set out in the claims.

According to a first aspect of the present disclosure, a timber working device, can comprise a frame, having a feed axis, a controller, adapted to control the timber working device, a drive system, configured to feed at least one stem along the feed axis, at least a pair of upper knives or lower knives movably attached to the frame, wherein the knives are configured to be controllable each by an actuator to open and close around a stem, a tilt mechanism comprising, a controllable tilt bracket pivotably attached to the frame, to control a tilt angle of the frame in relation to the tilt bracket, detection equipment adapted to sense or calculate the tilt angle of the tilt bracket and/or the movement of the timber working device According to a second aspect of the present disclosure, a method of controlling a timber working device, the timber working device can comprise, a frame, having a feed axis, a controller, adapted to control the timber working device, a drive system, configured to feed at least one stem along the feed axis, at least a pair of upper knives and/or lower knives movably attached to the frame, wherein the knives are configured to be controllable each by an actuator to open and close around a stem, a tilt mechanism comprising, a controllable tilt bracket pivotably attached to the frame, to control a tilt angle of the frame in relation to the tilt bracket, detection equipment adapted to sense or calculate a tilt angle of the tilt bracket and/or the movement of the timber working device, wherein the upper and/or lower knives and/or a tilt torque and/or the drive system are controlled in relation to the tilt angle.

According to a third aspect of the present disclosure, a working vehicle for forestry application can comprise a crane, the crane being outfitted with a timber working device, comprising, a frame, having a feed axis, a controller, adapted to control the timber working device, a drive system, configured to feed at least one stem along the feed axis, at least a pair of upper knives or lower knives movably attached to the frame, wherein the knives are configured to be controllable each by an actuator to open and close around a stem, a tilt mechanism comprising, a controllable tilt bracket pivotably attached to the frame, to control a tilt angle of the frame in relation to the tilt bracket, detection equipment adapted to sense or calculate the tilt angle of the tilt bracket and/or the movement of the crane or the timber working device.

It is an object of the present embodiments to overcome the disadvantages.

DETAILED DESCRIPTION

Figure 1:
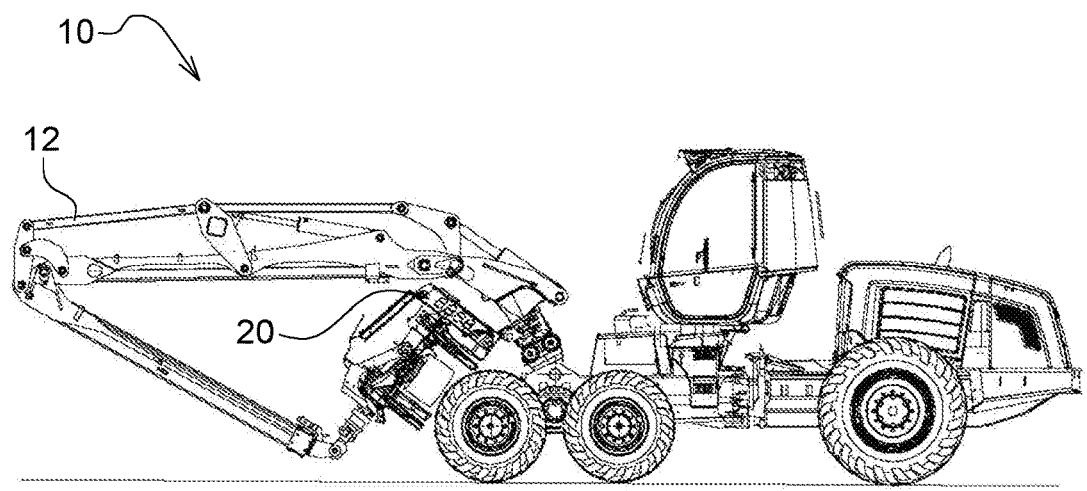
FIG. 1 shows a view of a common working vehicle, especially in the forestry industry.

The present embodiments concern a timber working device for felling and/or processing logs, a method for a timber working device and a working vehicle.

The embodiments include a timber working device, comprising a frame, having a feed axis, a controller, adapted to control the timber working device, a drive system, configured to feed at least one stem along the feed axis, at least a pair of upper knives or lower knives movably attached to the frame, wherein the knives are configured to be controllable each by an actuator to open and close around a stem, a tilt mechanism comprising, a controllable tilt bracket pivotably attached to the frame, to control a tilt angle of the frame in relation to the tilt bracket, detection equipment adapted to sense or calculate the tilt angle of the tilt bracket and/or the movement of the timber working device.

The timber working device allows to adjust the tilt force and/or the closing force of the knives and/or the closing force of the feeding wheels of the drive system according to the specific harvesting conditions. In case of a tilt angle larger than a predetermined value, the boom and the harvester head are pulled along the log by the drive system so that the force vector of the boom and the force vector of the feeding of the log are pointing in the same direction. In such a case the upper knives are controlled to close with a higher force wherein the lower knives, if applicable, are controlled with a lower closing force than the upper knives. At the same time the tilt torque can be increased so that a wide tilt angle is maintained. Also, the drive system may increase the pressure of the feeding wheels so that a higher pull force is used on the stem. This allows the lower knives to avoid a high closing pressure of the log so that the log and its surface can be feed through without further damaging the surface and the forces between feeding and the tilt and the knives can be balanced depending on the tilt angle. In case of a tilt angle smaller that a predetermined value, and/or if movement of the timer working device is detected, the controller determines that the timber working device is pulled along the stem, so that the feeding direction and the boom force vector are pointed in opposite directions. The lower knives are controlled to have a higher closing force than the upper knives and the tilt torque is set to zero. This enables a smooth feeding of the log via the upper knives and a following of the stem by tilt of the timber working device.

In another embodiment the detection equipment is an angle sensor.

The angle sensor allows to measure the tilt angle which can be used for direct control of the knives and the tilt torque depending on the measurement results. Further, the angle of the crane can be measured so that real time movement is detected.

In another embodiment the detection equipment is an accelerometer or inclinometer sensor.

With an accelerometer or inclinometer, the tilt angle can be calculated from the timber working device. Additionally, these sensors may be place on any convenient location inside the harvester head, so that they are well protected from damage or wear.

Another embodiment is a method of controlling a timber working device, the timber working device comprising, a frame, having a feed axis, a controller, adapted to control the timber working device, a drive system, configured to feed at least one stem along the feed axis, at least a pair of upper knives and/or lower knives movably attached to the frame, wherein the knives are configured to be controllable each by an actuator to open and close around a stem, a tilt mechanism comprising, a controllable tilt bracket pivotably attached to the frame, to control a tilt angle of the frame in relation to the tilt bracket, detection equipment adapted to sense or calculate a tilt angle of the tilt bracket and/or the movement of the timber working device, wherein the upper and/or lower knives and/or a tilt torque and/or the drive system are controlled in relation to the tilt angle.

The method allows to adjust the tilt force and/or the closing force of the knives and/or the closing force of the feeding wheels of the drive system according to the specific harvesting conditions.

In case of a tilt angle larger than a predetermined value, the boom and the harvester head are pulled along the log by the drive system so that the force vector of the boom and the force vector of the feeding of the log are pointing in the same direction. In such a case the upper knives are controlled to close with a higher force wherein the lower knives, if applicable, are controlled with a lower closing force than the upper knives. At the same time the tilt torque can be increased so that a wide tilt angle is maintained. Also, the drive system may increase the pressure of the feeding wheels so that a higher pull force is used on the stem. This allows the lower knives to avoid a high closing pressure of the log so that the log and its surface can be feed through without further damaging the surface and the forces between feeding and the tilt and the knives can be balanced depending on the tilt angle.

In case of a tilt angle smaller that a predetermined value, and/or if movement of the timer working device is detected, the controller determines that the timber working device is pulled along the stem, so that the feeding direction and the boom force vector are pointed in opposite directions. The lower knives are controlled to have a higher closing force than the upper knives and the tilt torque is set to zero. This enables a smooth feeding of the log via the upper knives and a following of the stem by tilt of the timber working device.

In another embodiment either the closing force of the upper knives or the lower knives is increased if the tilt angle is larger than 90 degrees or smaller than 90 degrees, preferably larger than 105 degrees and smaller than 75 degrees.

In case the tilt angle is smaller than 90 to 75 degrees the tilt torque is not increased, and the closing force of the lower knives is increased while the closing force of the upper knives is decreased. The force vector of the feeding of the log and the force vector of the boom are pointing in opposite directions so that the operator is actively steering the boom together with the harvester head towards the tree top or log end. This helps with avoiding unnecessary high closing forces of the upper knives which would lead to damage of the log and higher feeding forces.

In case the tilt angle is larger than 90 to 105 degrees, the closing force of the upper knives is increased together with the tilt force, ensuring a good grip on the stem.

In another embodiment the tilt torque is increased if the tilt angle is larger than 90 degrees, preferably larger than 105 degrees.

The increased tilt torque help supporting the adjustment of the closing forces of the upper and lower knives. A higher tilt torque results in avoiding a high strain of the log on the upper knives as well as reducing the necessary closing force that has to be applied to the upper knives.

In another embodiment the tilt torque is not increased if the tilt angle is smaller than 90 degrees, preferably smaller than 75 degrees.

When the tilt angle is smaller than 90 to 75 degrees, the harvester head is pulled along the log in the feeding direction by active steering of the operator. In such a case an increased tilt torque would lead to a higher strain on the log and the upper knives, leading to further wear and tear on the log surface and a higher closing force of the knives. By applying no tilt torque, the harvester head can easily follow the feeding angle of the log. At the same time the lower knives are actuated with a higher closing pressure so that an accurate feeding operation of the log within the harvester head is ensured.

In another embodiment a pressure of the drive system feeding wheels on the log is increased if the tilt angle is larger than 90 degrees, preferably larger than 105 degrees.

This helps feeding the log through wherein the forces of the upper, lower knives and the tilt torque are balanced to ensure a fast working cycle.

Another embodiment concerns a working vehicle for forestry application comprising a crane, the crane being outfitted with a timber working device, comprising a frame, having a feed axis, a controller, adapted to control the timber working device, a drive system, configured to feed at least one stem along the feed axis, at least a pair of upper knives or lower knives movably attached to the frame, wherein the knives are configured to be controllable each by an actuator to open and close around a stem, a tilt mechanism comprising a controllable tilt bracket pivotably attached to the frame, to control a tilt angle of the frame in relation to the tilt bracket, detection equipment adapted to sense or calculate the tilt angle of the tilt bracket and/or the movement of the crane or the timber working device.

The vehicle allows operating a harvester head with less wear on the logs and upper and lower knives. The work speed is increased as each process takes less time as well as the quality of the log products. The knives are actuated on a lower pressure level when compared with current logging systems. This results in less strain and work load on the hydraulic actuators, engine and pumps and reduces fuel consumption.

In another embodiment the detection equipment is an angle sensor.

The angle sensor allows to measure the tilt angle which can be used for direct control of the knives and the tilt torque depending on the measurement results. Further, the angle of the crane can be measured so that real time movement is detected.

In another embodiment the detection equipment is an accelerometer or inclinometer sensor.

With an accelerometer or inclinometer, the tilt angle can be calculated from the timber working device. Additionally, these sensors may be place on any convenient location inside the harvester head, so that they are well protected from damage or wear.

In another embodiment the detection equipment is adapted to measure or calculate a slew angle of the crane in view of the working vehicle and a feeding angle of the timber working device in view of the working vehicle so that a movement status of the crane is detected in view of a feeding direction The slew angle can be measured or calculated from the crane position on the working vehicle which omits placing a sensor on the harvesting head. This allows the installment further away from the exposed position of the harvester head and from any danger of damage. Further the detection of the slew angle and a feeding angle apart from the harvester head enables to use different timber working devices with the embodiments included herein.

Further advantages are described in the following figures, wherein

Figure 2:
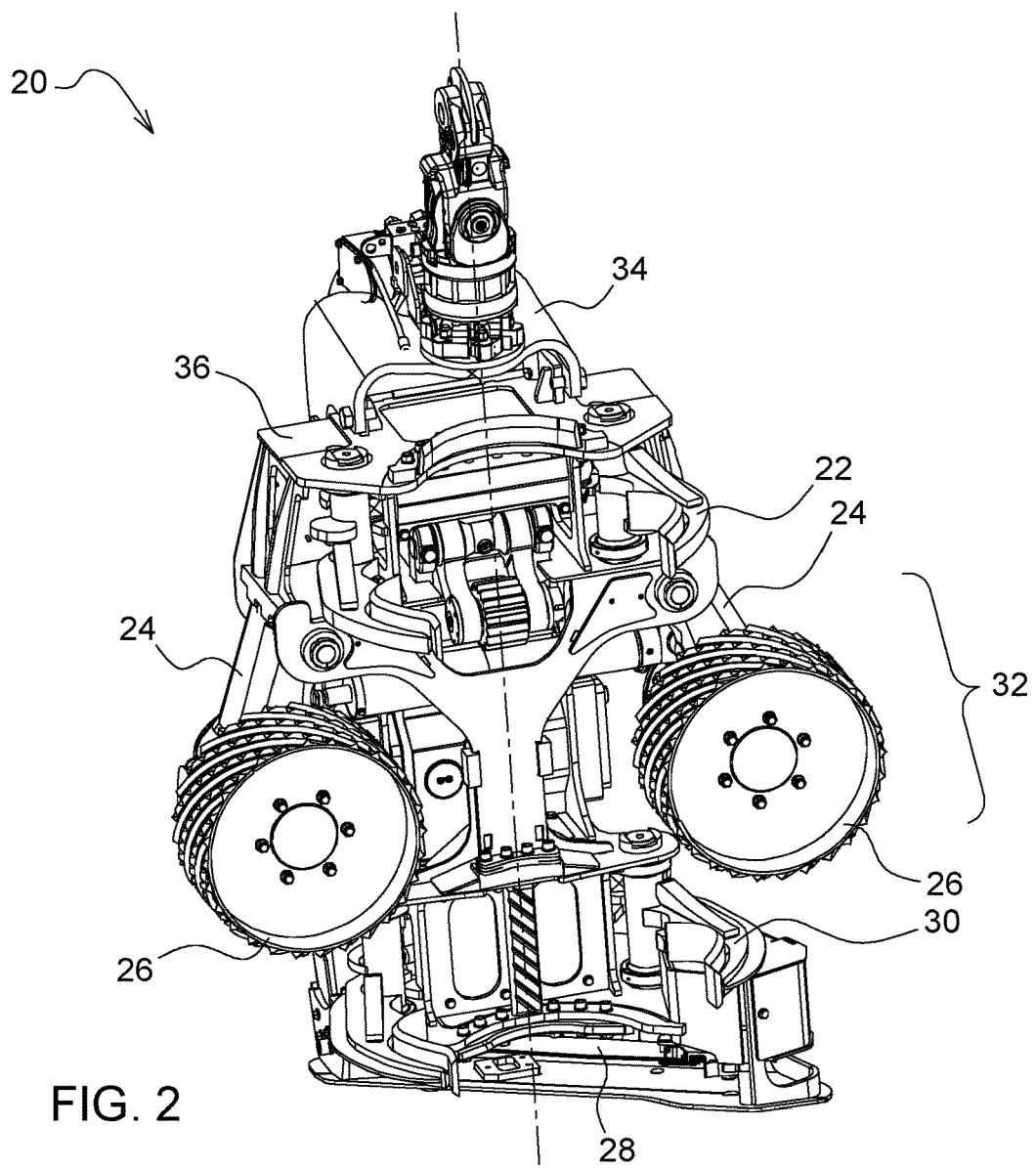
FIG. 2 displays a timber working device, e.g. a harvester head for a forestry machine.
Figure 3:
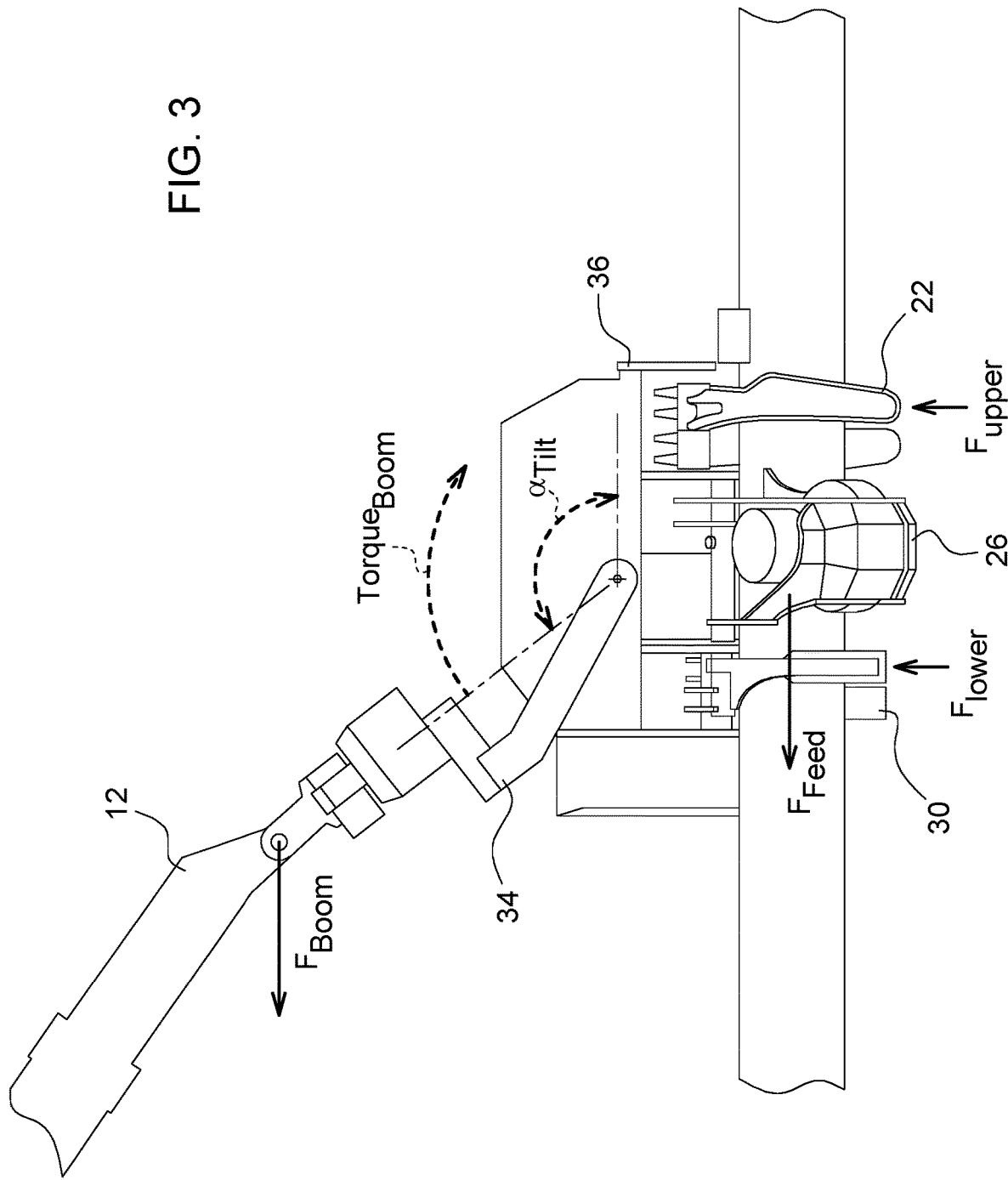
FIG. 3 shows one operation type for embodiments of the disclosure.
Figure 4:
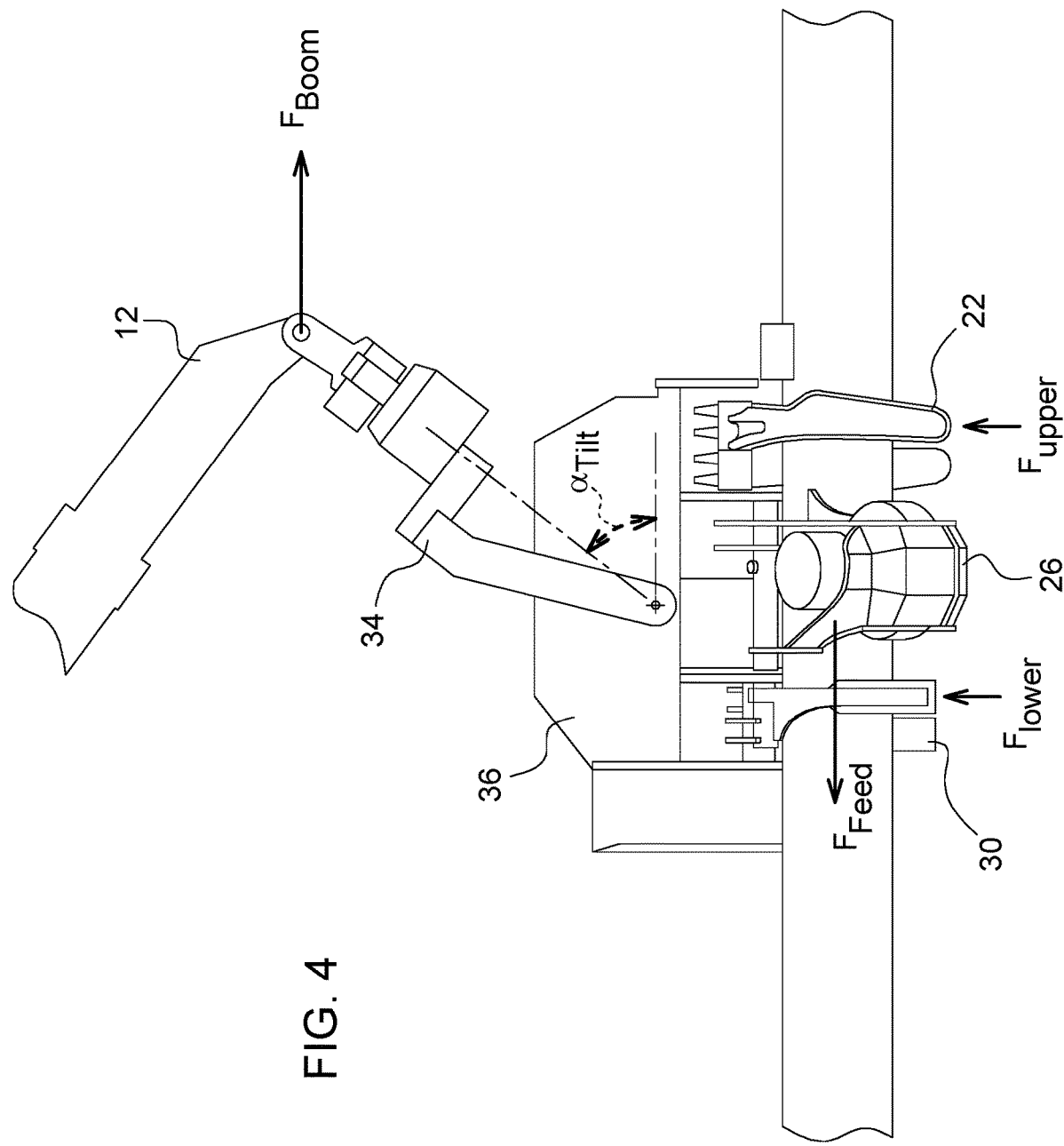
FIG. 4 depicts another operation type of embodiments of the disclosure.

FIG. 1 shows a view of a common working vehicle, especially in the forestry industry;

FIG. 2 displays a timber working device, e.g. a harvester head for a forestry machine;

FIG. 3 shows one operation type for the embodiment;

FIG. 4 depicts another operation type of the embodiments.

FIG. 1 shows a forest harvester vehicle. It comprises usually a front and rear chassis which are articulated and a cabin for the operator. The vehicle has a crane 12 to which a timber working device 20, e.g. a harvester head is attached. The crane 12 is able to rotate and to tilt, further to extend and to rotate the timber working device 20. For the felling and processing of a tree into logs, the operator extends and maneuvers the crane 12 so that the harvester head is able to close the upper 22 and lower knives 30 around the tree stem. The operator cuts the tree with the integrated saw blade 28 so that the stem falls over and is held at the lower end with the knives of the harvester head. In a next step the drive system 32, consisting of the feeding arms 24 holding the feeding wheels 26, is operated so that the feeding wheels 26 by their gripping surface pull or push the stem through the harvester head from the upper 22 to the lower knives 30, so that the stem can be cut into logs of predetermined length, controlled by the drive system 32.

When the feeding wheels 26 transport the stem through the harvester head, the knives need to maintain a close grip to ensure the stem stays within operational parameter and is kept safely inside the harvester head. Also, the knives are used to remove branches and bark from the stem. This leads to the difficulty that a tight grip may remove the branches easily but will at the same time increase the friction of the stem and thus increase the work load on the drive system 32 which can lead to damages to the surface and a loss of quality.

Further, there are two standard operational cases where the load and the control requirements for the harvester head are contradictory. In a first case, when the stem is cut, the harvester head position is kept unchanged by maintaining the position of the crane tip, holding the harvester head. In this case, the drive system 32 starts pulling or pushing the stem, so that the feeding force is transferred directly to the frame 36 of the harvester head, to the tilt bracket 34 and onwards to the crane 12. As a result, the vector of the force acting on the boom and the vector of the feeding force are oriented in the same direction and the tilt angle is larger than 90 degrees. The harvester head is pulled by the drive system 32 along the stem, so that the crane 12 has to act against this pulling movement. This mode leads to a high tilt force caused by the stem and acting on the upper knives 22. Yet, if the upper knives 22 are kept in the highest closing pressure without a proper force control, this adds additional strain to the drive system 32 and to the stem surface. It is necessary to find a balance between a high output work condition and a reliable log quality.

In a second case, when holding the stem after cutting, the operator uses the boom to pull the harvester head along the stem to ensure the knives are able to cut off thicker branches or move along an uneven stem surface. In this case the vector of the boom force and the vector of the feeding force are pointed in opposite directions. This leads to a tilt angle which is smaller than 90 degrees and a high force requirement on the lower knives 30 to ensure secure processing of the stem. As in the first case the same conditions apply in case the closing force of the lower knives 30 is too high or uncontrolled.

The harvester head of the present embodiments is shown in FIG. 2. It has a frame 36 which is extending along a feeding axis for a tree or log and a movably fixed tilt bracket 34 which is attachable to a crane 12 of a working machine. The frame 36 contains all necessary parts and devices to ensure the operation of the harvester head, such as controllers, hydraulic hubs, lines, motor and valves. It further comprises arms 24 rotatably holding the feeding wheels 26 so that these can be pushed against the stem surface. Above the feeding wheel are the upper knives 22 or upper delimbing knives and below are the lower knives 30 which are controlled by hydraulic actuators usually but may also be controlled by electric actuators or motors. At the bottom of the frame 36 the saw blade 28 is placed below the lower knives 30.

During cutting operation the upper 22 and lower knives 30 are closed around the stem. The harvester head may only have upper 22 or lower knives 30, this does not change the operation procedure. Further, the harvester head may have more than two feeding wheels 26, such as four, which also does not alter the process or use of this embodiment.

The timber working device 20 may have an angle sensor at the axle between the frame 36 and the tilt bracket 34. With this sensor the tilt angle can be directly measured and from the values the operational status can be derived. The two different modes of interest are a tilt angle larger and smaller than 90 degrees. According to the tilt angle the hydraulic pressure of the actuators of the knives is controlled so that only the necessary holding force is applied instead of applying excessive holding force which would lead to the above described negative effects.

The timber working device 20 may also have an acceleration sensor which can measure the movement of the timber working device 20. Wherein the first case, the harvester head mainly remains stable in position and the stem is pulled through the harvester head. The acceleration during this operation are rather low, so that it can clearly be distinguished form the second case. In the second case the harvester head is pulled by movement of the crane 12, so that the acceleration values are significantly higher than in the first case. By this difference the two modes may be distinguished, and the closing force and tilt torque of the harvester head is controlled accordingly by the control system.

The timber working device 20 may also have an inclination sensor which can measure the tilt value of the harvester head. The sensor can be placed conveniently on the harvester head away from potentially hazardous areas where the risk of damage is high.

As another alternative, the crane 12 may have an angle sensor or acceleration sensor so that the orientation and movement of the crane 12 is measurable. A sudden increase in acceleration together with simultaneous activity of the feeding motors and the actuators of the knives this allows the identification of the two different operation cases. Further, the crane 12 may have an angle sensor in its tip so that direct measurement of the tilt angle is possible.

FIG. 3 show the first operational case with a tilt angle larger than 90 degrees. The Figure depicts a log being held horizontally by the harvester head. The log is held in position by the upper 22 and lower knives 30 and is being pulled by the feeding wheels 26 of the drive system 32. The crane 12 holding the harvester head is in a stable position, so that the feeding wheels 26 pull the harvester head along the feeding axis. Thereby the horizontal distance between the harvester head and the tip of the crane 12 increases which leads to a tilt angle being larger than 90 degrees. In this case the upper knives 22 come under the full load from the stem so that the upper knives 22 are actuated with a higher closing force to keep the stem in position. At the same time, the actuation force of the lower knives 30 is reduced by the control system in order to compensate the grip force and because it was discovered that the lower knives 30 do not need a high gripping force. This results in a lower handling force of the stem, so that the controlling of the knives allows a smoother handling. In parallel, the tilt torque, controlling the position of the tilt bracket 34 is also increased, which further attributes to a lower necessary closing force of the knives. The feeding wheels 26 may be controlled to have a higher pressure on the stem surface to compensate for the upper knives 22 closing force.

FIG. 4 shows the second operation case. The harvester head is supported by the crane 12 and holds the stem the same way as in the first operation case. Yet, in this situation, the operator moves or turns the crane 12 against the feeding direction of the stem while the stem is pulled by the feeding wheels 26. This is done to use the inertia of the stem in cases where the tree has a larger diameter, more branches or is overall taller and would slow down the harvesting process. This results in a tilt angle being smaller than 90 degrees as the crane 12 pulls the harvester head along the stem. In this case the upper knives 22 are receiving less load than the lower knives 30 as the stems dynamic balance puts more pressure on the lower knives 30. In order to ensure a smooth processing, when the case is recognized by the control system, the knives are automatically adjusted, so that the closing force of the lower knives is increased and the closing force of the upper knives 22 is decreased along with reducing the tilt torque of the tilt bracket 34, which may be also zero.

The invention claimed is:

1. A timber working device, comprising
a frame, having a feed axis,
a controller, adapted to control the timber working device,
a stem drive system, configured to feed at least one stem along the feed axis,
at least a pair of upper knives or lower knives movably attached to the frame, wherein the knives are configured to be controllable each by an actuator to open and close around a stem,
a tilt mechanism comprising, a controllable tilt bracket pivotably attached to the frame, to control a tilt angle of the frame in relation to the tilt bracket, angle detection equipment adapted to sense or calculate the tilt angle of the tilt bracket and/or the movement of the timber working device,
wherein the controller
receives a signal from the angle detection equipment,
adjusts, based on the signal from the angle detection equipment, one or more of the upper pair of knives, the lower pair of knives, a tilt torque, and the stem drive system, wherein the adjustment comprises one or more of (a) increasing a closing force of the upper pair of knives or the lower pair of knives based on the sensed or calculated tilt angle and (b) increasing a pressure of the stem drive system based on the sensed or calculated tilt angle.

2. Timber working device according to claim 1, wherein the angle detection equipment is an angle sensor.

3. Timber working device according to claim 1, wherein the angle detection equipment is an accelerometer or inclinometer sensor.

4. A method of controlling a timber working device, the timber working device comprising,
a frame, having a feed axis,
a controller, adapted to control the timber working device,
a stem drive system, configured to feed at least one stem along the feed axis, at least a pair of upper knives and a pair of lower knives movably attached to the frame,
wherein the pair of upper knives and the pair of lower knives are each configured to be controllable by an actuator to open and close around a stem, a tilt mechanism comprising, a controllable tilt bracket pivotably attached to the frame, to control a tilt angle of the frame in relation to the tilt bracket, angle detection equipment adapted to sense or calculate a tilt angle of the tilt bracket and/or the movement of the timber working device, wherein the controller is receives a signal from the angle detection equipment, adjusts, based on the signal from the angle detection equipment, one or more of the upper pair of knives, the lower pair of knives, a tilt torque, and the stem drive system, wherein the adjustment comprises one or more of (a) increasing a closing force of the upper pair of knives or the lower pair of knives based on the sensed or calculated tilt angle and (b) increasing a pressure of the stem drive system based on the sensed or calculated tilt angle.

5. The method of controlling a timber working device according to claim 4, further comprising increasing the tilt torque if the tilt angle is larger than 90 degrees.

6. The method of controlling a timber working device according claim 4, further comprising maintaining the tilt torque if the tilt angle is smaller than 90 degrees.

7. The timber working device according to claim 1, further comprising increasing a pressure of the stem drive system feeding wheels on a log if the tilt angle is larger than 90 degrees.

8. The method of controlling a timber working device according to claim 4, further comprising increasing a pressure of a stem drive system feeding wheels on a log if the tilt angle is larger than 90 degrees.

9. A working vehicle for forestry application comprising a crane, the crane being outfitted with a timber working device, comprising, a frame, having a feed axis, a controller, adapted to control the timber working device, a stem drive system, configured to feed at least one stem along the feed axis, at least a pair of upper knives or lower knives movably attached to the frame, wherein the knives are configured to be controllable each by an actuator to open and close around a stem, a tilt mechanism comprising, a controllable tilt bracket pivotably attached to the frame, to control a tilt angle of the frame in relation to the tilt bracket, angle detection equipment adapted to sense or calculate the tilt angle of the tilt bracket and/or the movement of the crane or the timber working device, wherein the controller receives a signal from the angle detection equipment, adjusts, based on the signal from the angle detection equipment, one or more of the upper pair of knives, the lower pair of knives, a tilt torque, and the stem drive system, wherein the adjustment comprises one or more of (a) increasing a closing force of the upper pair of knives or the lower pair of knives based on the sensed or calculated tilt angle and (b) increasing a pressure of the stem drive system based on the sensed or calculated tilt angle.

10. The working vehicle according to claim 9, wherein the angle detection equipment is an angle sensor.

11. The working vehicle according to claim 10, wherein the angle detection equipment is adapted to measure or calculate a slew angle of the crane in view of the working vehicle and a feeding angle of the timber working device in view of the working vehicle so that a movement status of the crane is detected in view of a feeding direction.

12. The working vehicle according to claim 9, wherein the angle detection equipment is an accelerometer or inclinometer sensor.

13. The working vehicle according to claim 12, wherein the angle detection equipment is adapted to measure or calculate a slew angle of the crane in view of the working vehicle and a feeding angle of the timber working device in view of the working vehicle so that a movement status of the crane is detected in view of a feeding direction.

14. The working vehicle according to claim 9, wherein the angle detection equipment is adapted to measure or calculate a slew angle of the crane in view of the working vehicle and a feeding angle of the timber working device in view of the working vehicle so that a movement status of the crane is detected in view of a feeding direction.

\* \* \* \* \*